Patented Sept. 14, 1954

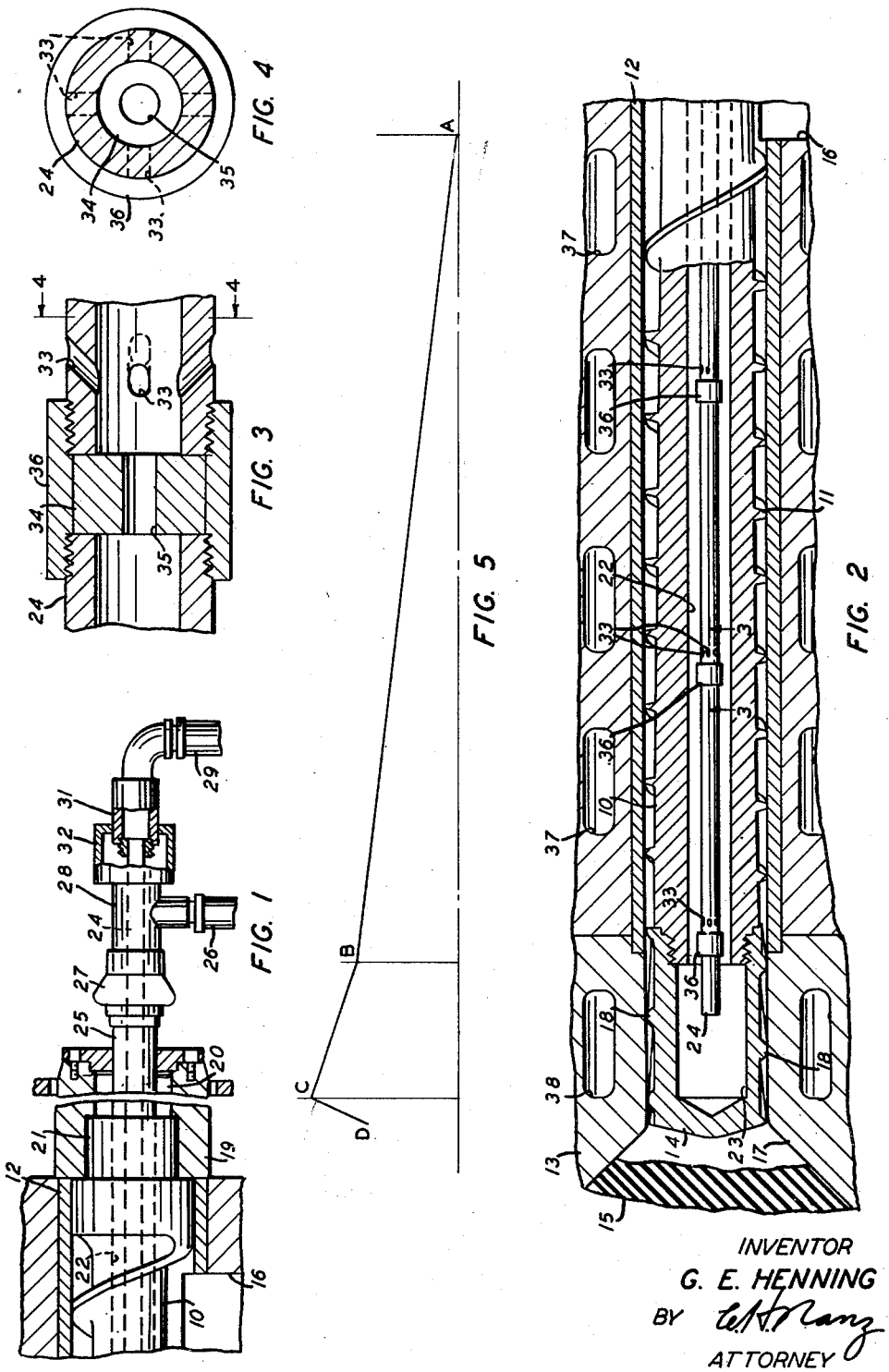

2,688,770

UNITED STATES PATENT OFFICE 2,688,770

METHOD OF AND APPARATUS FOR CONTROLLING THE TEMPERATURE OF PLASTIC MATERIAL

George E. Henning, Baltimore, Md., assignor to Western Electric Company, Incorporated, New York, N. Y., a corporation of New York Application May 4, 1951, Serial No. 224,580

11 Claims. (Cl. 18—12)

This invention relates to methods of and apparatus for controlling the temperature of plastic material, and more particularly to methods of and apparatus for controlling the temperature of plastic material being advanced by a stock screw of an extruder.

It has long been recognized that the temperatures in the interior of an extruder must be properly regulated, in order to control the plasticity of the material being extruded. When a highly accelerated, vulcanizable, elastomer compound is being extruded, attention must be given to the problem of temperature control, because excessively high temperatures may cause localized premature vulcanization of such a compound to occur, and clogging of the extruder may result. It is especially important to exert such temperature control when a thermoplastic compound, such as polyethylene or polyvinyl chloride, is being extruded, because the capacity of a stock screw to advance such a thermoplastic compound may be critically affected by the temperature of the thermoplastic compound distributed therealong.

The procedure of providing a plurality of annular channels for circulating a cooling fluid about the exterior of an extrusion bore is well known in the extruding art. The practice of providing the stock screw with an interior bore and supplying a cooling medium under pressure to a tube which is disposed longitudinally within the interior bore is also well recognized. These prior art practices have been effective to prevent the stock screw from overheating at the delivery end thereof, and to provide a crude and limited control of the temperature along the exterior of the extrusion bore. However, the devices of the prior art have been incapable of producing an ideal temperature gradient in the plastic material disposed along the stock screw, and these devices have not been satisfactory for accurately controlling the temperature of the plastic material at successive points along the extruding screw in order to produce an ideal temperature gradient.

An object of the invention is to provide new and improved methods of and apparatus for controlling the temperature of plastic material.

Another object of the invention is to provide new and improved methods of and apparatus for controlling the temperature of plastic material disposed along a stock screw of an extruder.

A method illustrating certain features of the invention may include admitting a cooling medium under pressure into the chamber of a longitudinally chambered stock screw of an extruder, and controlling the circulation of the cooling medium within successive portions of the chamber of the stock screw to maintain in the plastic material a predetermined temperature gradient therealong.

An apparatus illustrating certain features of the invention may include a stock screw having a longitudinal bore therein, means for admitting a cooling medium under pressure into the bore and means for controlling the circulation of the cooling medium at successive spaced points along the bore to maintain a predetermined temperature gradient in plastic material disposed along the stock screw.

A complete understanding of the invention may be obtained from the following detailed description of methods and apparatus forming specific embodiments thereof, when read in conjunction with the appended drawing, in which:

Fig. 1 is a horizontal, longitudinal, sectional view of the entrance end portion of a stock screw for an extruder, embodying certain features of the invention;

Fig. 2 is a continuation of the left hand end of Fig. 1, showing the advancing and delivery end portions of the stock screw;

Fig. 3 is an enlarged sectional view taken along line 3—3 of Fig. 2;

Fig. 4 is a sectional view taken along line 4—4 of Fig. 3, and

Fig. 5 is a diagram of an ideal temperature gradient for plastic material disposed along the stock screw.

Referring now in detail to the drawing, a stock screw 10 having a helical rib 11 is disposed longitudinally within an imperforate cylindrical casing 12. The clearance is extremely small between the top of the helical rib 11 and the wall of the cylindrical casing 12, so that a plastic material may be positively advanced by the stock screw 10. A cylindrical casing 13 is secured to the stock screw casing 12, and within the cylindrical wall of the casing 13 an extension 14 is threadedly secured to the delivery end portion of the stock screw 10. The stock screw 10 and its extension 14 are designed to advance a mass of plastic material 15 from an entrance hopper 16 to a delivery orifice 17, and to plasticize the material while it is being so advanced.

The top of the helical rib 11 is equidistantly, closely spaced from the wall of the cylindrical casing 12 throughout the length of the stock screw 10 from the entrance end portion to the delivery end portion thereof. However, the root portion of the stock screw 10 is tapered to increase in diameter from the entrance end portion to the delivery end portion thereof, so that the plastic material will receive a working action as it is advanced therealong. Certain features of this type of stock screw are described and claimed in A. N. Gray Patent 2,547,000, issued April 3, 1951, for "Apparatus for Simultaneously Advancing and Plasticizing Plastic Compounds."

At the delivery end portion of the stock screw 10, the advancing plastic material is given a severe working action by the extension 14. A plurality of round-topped helical ribs 18—18 on the extension 14, are closely spaced from the cylindrical casing 13. The pitch and clearances of these ribs are such that the pastic material is subjected to an extremely vigorous working or kneading action at this point.

The stock screw 10 and its extension 14 are rotated by means of a conventional driving means (not shown) geared to a suitable mechanism 20 enclosed within a gearing housing 19. Secured to the end of the stock screw 10 near the entrance end portion thereof, is a boss 21 which extends into the gearing housing 19.

The temperature of the plastic material being advanced along the stock screw 10 and its extension 14, is controlled primarily by means located within the body of the screw and its extension. For this purpose the stock screw 10 is provided with an interior cylindrical bore 22, and the extension 14 is provided with an interior chamber 23, through which a cooling medium may be circulated. An elongated tube 24 is disposed longitudinally throughout the length of the interior bore 22, and may protrude into the chamber 23 of the extension 14. An extension pipe 25 is secured to the boss 21, and the interior bore 22 is in communication with a discharge pipe 26 through the extension pipe 25, a rotatable sealing coupling 27, and a T-shaped pipe 28. The elongated tube 24 is in communication with a supply pipe 29 through a fixed coupling 31 having a housing 32. The T-shaped pipe 28 is secured to the housing 32 and is effective to drain the contents of this housing to the discharge pipe 26.

At spaced points along the tube 24, it is provided with a plurality of ports 33—33, and adjacent plugs 34—34 each having an axial bore 35. The plugs 34—34 serve as flow regulators to divert outwardly a portion of the incoming supply of cooling medium through the ports 33—33 at each of the spaced points along the tube 24 at which these ports are located. An elongated tube having such restrictions at spaced points along its length may be constructed to permit quick removal and interchange of the plugs. In Fig. 3 there is shown such an arrangement, wherein sections of the tube 24 are joined on opposite sides of the plug 34 by a threaded sleeve 36 secured to the plug 34.

An auxiliary means may be provided exterior of the stock screw 10 and its extension 14, for controlling the temperature of the advancing plastic material. Such means may include a plurality of annular channels 37—37 surrounding the cylindrical casing 12, and an annular channel 38 located within the cylindrical casing 13. A hot or a cold fluid, as desired, may be circulated through the annular channels 37—37 and 38.

The relative temperatures of the plastic material at successive points along its path of travel, while being advanced by the stock screw 10 and the extension 14, may be illustrated by a curve similar to the one shown diagrammatically in Fig. 5. The temperature gradient shows a gradual rise from about room temperature at the entrance end of the stock screw 10, indicated at point A, to the delivery end portion of the stock screw, indicated at point B, and then rises at a somewhat greater slope to the delivery end portion of the extension 14, designated point C, at which point the temperature drops rather abruptly to point D. This gradient represents ideal temperature conditions prevailing as a result of proper functioning of the temperature controlling system for a stock screw and a stock screw extension of this type.

As the plastic material is advanced and kneaded by the stock screw 10 and then given a vigorous working treatment by the extension 14, a considerable amount of heat is generated in the material. It is the function of the temperature controlling system to dissipate this heat, and to control the dissipation of the heat at various stages of the advancing and working process so that the temperature conditions prevailing in the plastic material will approximate those represented in Fig. 5. The clearance between the ribs 18—18 of the extension 14 and the surrounding wall of the casing 13 is so small, and the helix angle of the ribs 18—18 is such, that the greatest amount of heat is generated during the exceedingly vigorous working action which occurs at this stage. While a high temperature is necessary in order to assist this kneading action, and to aid in causing the long molecules of a vulcanizable, elastomer compound to breakdown, the temperature must not be too high at this stage, lest scorching of the compound occur.

In the case of a thermoplastic compound, the material may become so fluid, if not controlled, that the helical ribs would be unable to exert an advancing action thereon. In processing a thermoplastic compound, the delivery characteristics of an extrusion screw may be materially affected by the temperature of the compound in the pusher section of the screw. The primary function of the stock screw 10 is to advance the plastic material, and the portion of the extrusion apparatus occupied by this stock screw 10 may be termed the pusher section, whereas the primary function of the extension 14 is to knead the plastic material, and this portion of the apparatus may be termed the plasticizing section. If a thermoplastic compound becomes overheated in the pusher section, the compound may become so fluid that the stock screw will be incapable of building up pressure in this section to advance the compound efficiently to force it through the plasticizing section of the extrusion apparatus.

This effect upon the delivery efficiency of an extruding screw may be strikingly illustrated during the extrusion of polyethylene. Where the screw is delivering this thermoplastic compound to a die having a small orifice so that a high pressure head is created at the delivery end of the screw, merely by increasing the temperature of the fluid circulating through the interior of the screw in the pusher section from about 76° F. to about 136° F., the delivery efficiency may be reduced as much as 50%.

The number of pounds of plastic which can be extruded per hour against a high pressure head is necessarily relatively small. However, the temperature control afforded by the methods and apparatus embodying the invention, are effective to enable production to be maintained at a relatively high rate. It is in the process of extruding against a high pressure head, such as in the production of extremely thin plastic sheaths, that the advantages of the invention are most evident.

When a cooling medium, such as water, is introduced through the supply pipe 29, it will traverse the elongated tube 24, and as the series of throttling plugs 34—34 are encountered, minor portions of the medium will be diverted through the ports 33—33 and counterflowed back along the bore 22 toward the entrance end portion of the stock screw 10, and then be directed out through the discharge pipe 26. As a result of successive counterflowing of minor portions of the cooling medium along the pipe 24, a temperature gradient of the incoming cooling medium and of the outgoing cooling medium would appear as a staggered curve. However, the resultant cooling effect upon the plastic material disposed along the stock screw 10 and its extension 14 should make the temperature gradient in this material approximate the curve illustrated diagramatically in Fig. 5.

In processing a vulcanizable elastomer compound, it may be desirable to have the greatest cooling effect occur at the delivery end portion of the extruding screw. In such case, a major portion of the cooling fluid would be introduced into the chamber 23 in the extension 14, and only small portions of the fluid would be diverted through the ports 33—33 at intervals along the tube 24. However, in the case of a thermoplastic compound, only a small portion of the cooling medium may be needed in the chamber 23; the remainder of the incoming fluid may be successively diverted through the ports 33—33, and all of the fluid may then counterflow to an exit at the entrance end of the stock screw.

Manifestly, the use of a cooling tube having ports at spaced intervals therealong would be most advantageous in a pressure cooling system, i. e., a system in which the cooling fluid is admitted under pressure into the interior of the stock screw. In this instance, an increase in the volume of fluid admitted would cause a correspondingly increased cooling effect on each of the diversion points along the screw, in proportion to the amount of fluid diverted. If the cooling tube did not possess the ports embodied in the present invention, an increase in the volume of cooling medium admitted would primarily affect that portion of the screw beyond the discharge end of the cooling tube. Using a cooling system embodying the invention, it is possible to increase greatly the relative amount of fluid being admitted without greatly decreasing the temperature at the delivery end of the extruding screw, the primary effect being obtained in the pusher section of the extrusion screw.

It is evident that the flow regulators 34—34 may assume other configurations, and that these flow regulators may even be omitted, but that the essential method is to successively divert minor portions of the cooling fluid through ports located at intervals along a cooling tube within the screw, and to counterflow all of the fluid back along the interior bore of the extruding screw. The cooling medium may also be admitted through the pipe 26 and conveyed along the interior bore 22, exterior of the tube 24, enter the ports 33—33 and be counterflowed along the tube 24, and discharged through the pipe 29. Each of these methods is effective to achieve proper temperature conditions for the extrusion of plastic material with best results. Obviously, the spacing of the ports 33—33 and the plugs 34—34 along the tube 24 may be varied, as desired, to obtain different temperature conditions in the apparatus.

The methods and apparatus described herein may be effectively employed for different types of plastic materials, including vulcanizable elastomer compounds, such as, neoprene (polymerized chloroprene), Buna-S (a copolymer of butadiene and styrene) and natural rubber, and thermoplastics, such as, polyethylene and polyvinyl chloride. Since the plasticity and softening points of these various compounds are different, the desirable extrusion temperature for each compound will be different. However, the temperature gradient for each of these compounds should resemble the curve illustrated in Fig. 5, in which relative temperatures have been used.

The invention is not limited to the particular type of stock screw and extension illustrated herein, but may be applied to any type of extrusion screw. The problem of obtaining adequate heat exchange to satisfactorily control temperatures is ordinarily greatest in extrusion screws of large diameter, and the methods and apparatus embodying the invention are most useful in this instance. Furthermore, the merits of the invention are especially evident in extruding plastic material against a high pressure head, for example, in the production of extremely thin plastic sheaths.

What is claimed is:

1. The method of maintaining a predetermined temperature gradient in plastic material which is being advanced and kneaded by an extruding screw having an interior bore which is open at an entrance end portion of the screw and closed at a delivery end portion of the screw, which comprises flowing a cooling fluid in a stream along the bore from the open end toward the closed end thereof, successively withdrawing predetermined minor portions of the fluid from the stream to diminish the size of the stream as it progresses along the bore so that only a predetermined minor portion of the fluid reaches the closed end of the bore, and counterflowing all of said minor portions of the fluid along the bore toward the open end thereof.

2. The method of maintaining a predetermined temperature gradient in plastic material which is being advanced and kneaded by an extruding screw having an interior bore which is open at an entrance end portion of the screw and extends to a chamber in a delivery end portion of the screw, which comprises introducing a cooling fluid into the open end of the bore in the screw, flowing the fluid in a stream along the bore to the chamber in the delivery end portion of the screw, outwardly diverting predetermined minor portions of the fluid from the stream to diminish the size of the stream as it progresses along the bore so that only a predetermined minor portion of the fluid reaches the chamber, and counterflowing along the bore toward the open end thereof the fluid from the chamber and the portions of outwardly diverted fluid.

3. The method of maintaining a predetermined temperature gradient in plastic material which is being advanced and kneaded by an extruding screw having an interior bore which is open at an entrance end portion of the screw and extends to a chamber in a delivery end portion of the screw, which comprises introducing a cooling fluid into the open end of the bore in the screw, flowing the fluid in a stream along the bore to the chamber in the delivery end portion of the screw, inwardly diverting predetermined minor portions of the fluid from the stream to diminish the size of the stream as it progresses along the bore so that only a predetermined minor portion of the fluid reaches the chamber, and counterflowing along the bore toward the open end thereof the fluid from the chamber and the portions of inwardly diverted fluid.

4. The method of maintaining a predetermined temperature gradient in a thermoplastic compound which is being extruded by an extruding screw having an advancing section extending from an entrance end thereof to a plasticizing section at a delivery end thereof and having an interior bore which is open at the entrance end of the screw and is closed at the delivery end thereof, which comprises flowing a cooling fluid under pressure in a stream along the bore towards the closed end thereof, successively diverting predetermined minor portions of the fluid from the stream to diminish the size of the stream as it progresses along the bore so that only a predetermined minor portion of the fluid reaches the closed end of the bore and exerts a cooling effect in the plasticizing section of the screw, and counterflowing along the bore each of said predetermined minor portions of the fluid so that the principal cooling effect is exerted in the advancing section of the screw.

5. An apparatus for controlling the temperature of plastic material being advanced by an extruder, which comprises a stock screw having an interior bore which is open at an entrance end portion of the screw and is closed at a delivery end portion of the screw, means for introducing a cooling fluid into the bore through the open end thereof, means for flowing the cooling fluid along the bore to the closed end thereof, and means at successive spaced points distributed from the open end to the closed end of the bore for counterflowing predetermined minor portions of the fluid along the bore to the open end thereof, so that a predetermined temperature gradient is maintained in the plastic material.

6. An apparatus for controlling the temperature of plastic material being advanced by an extruder, which comprises a stock screw having an interior bore which is closed at a delivery end portion of the screw having a chamber therein and is open at an entrance end portion thereof, means for introducing a cooling fluid into the bore through the open end thereof, means for flowing the fluid along the bore to the chamber in the delivery end portion of the screw, means at successive spaced points distributed from the open end to the closed end of the bore for directing predetermined minor portions of the fluid toward the open end of the bore, and means for counterflowing all of the cooling fluid along the bore to the open end thereof, so that a predetermined temperature gradient is maintained in the plastic material.

7. An apparatus for maintaining a predetermined temperature gradient in plastic material which is being advanced and kneaded by an extruder, which comprises a rotatable stock screw having an interior bore which is open at an entrance end portion of the screw and extends to a chamber in a delivery end portion of the screw, an elongated tube disposed in spaced relationship within the bore from the entrance end thereof to the chamber at the other end thereof, means for admitting a cooling fluid under pressure into the tube at the open end of the bore, said tube having a plurality of ports at spaced points distributed along its length from one end to the other end thereof for counterflowing predetermined minor portions of the fluid toward the open end of the bore, and means for discharging the fluid from the open end of the bore.

8. An apparatus for maintaining a predetermined temperature gradient in plastic material which is being advanced and kneaded by an extruder, which comprises a cylindrical casing, a rotatable stock screw disposed within the casing and having an interior bore which is open at an entrance end portion of the screw and extends to a chamber in a delivery end portion of the screw, an elongated tube disposed in spaced relationship within the bore from the entrance end thereof to the chamber at the other end thereof, means for admitting a cooling fluid under pressure into the tube at the open end of the bore, said tube having a plurality of ports at spaced points distributed along its length from one end to the other end thereof for counterflowing predetermined minor portions of the fluid toward the open end of the bore, a plurality of flow regulators positioned one for each point adjacent to the spaced points along the tube having ports for diverting a portion of the fluid in the tube through the ports, and means communicating with the bore for discharging fluid therefrom.

9. An apparatus for maintaining a predetermined temperature gradient in plastic material which is being advanced and kneaded by an extruder, which comprises a cylindrical casing, a rotatable stock screw disposed within the casing and having an interior bore which is open at an entrance end portion of the screw and extends to a chamber in a delivery end portion of the screw, an elongated tube disposed in spaced relationship within the bore from the open end thereof to the chamber at the other end thereof, means for admitting a cooling fluid under pressure into the tube at the open end of the bore, said tube having a plurality of ports at spaced points distributed along its length from one end to the other end thereof for counterflowing predetermined minor portions of the fluid toward the open end of the bore, a plurality of cylindrical plugs having axial bores and positioned within the tube one for each point adjacent to the spaced points along the tube having ports for diverting a portion of the fluid in the tube through the ports, and means communicating with the bore exterior of the tube for discharging fluid therefrom.

10. An apparatus for maintaining a predetermined temperature gradient in a thermoplastic compound which is disposed along an extrusion screw having an advancing section extending from an entrance end thereof to a plasticizing section at a delivery end thereof and having an interior bore which is open at the entrance end of the screw and is closed at the delivery end thereof, which comprises an elongated tube positioned within the bore and extending through the advancing section of the screw to the plasticizing section thereof, means for admitting a cooling fluid under pressure into the tube near the entrance end of the screw, the portion of the tube in the advancing section of the screw being provided with a plurality of ports at intervals along the tube so that successive predetermined minor portions of the fluid may counterflow along the tube towards the open end thereof and only a predetermined minor portion of the fluid may reach the closed end of the bore, and means for discharging the fluid from the bore.

11. An apparatus for maintaining a predetermined temperature gradient in a thermoplastic compound which is disposed along an extrusion screw having an advancing section extending from an entrance end thereof to a plasticizing section at a delivery end thereof and having an interior bore which is open at the entrance end of the screw and is closed at the delivery end thereof, which comprises an elongated tube positioned within the bore and extending through the advancing section of the screw to the plasticizing section thereof, means for admitting a cooling fluid under pressure into the tube near the entrance end of the screw, the portion of the tube in the advancing section of the screw being provided with a plurality of ports at intervals along the tube so that successive predetermined minor portions of the fluid may counterflow along the bore towards the open end thereof and only a predetermined minor portion of the fluid may reach the closed end of the bore, a plurality of flow regulators positioned within the tube one for each interval adjacent to the ports therein for diverting the fluid in the tube through the ports, and means for discharging the fluid from the bore.

References Cited in the file of this patent

UNITED STATES PATENTS

| Number | Name | Date |
|---|---|---|
| 1,951,427 | Lodge | Mar. 20, 1934 |
| 1,964,600 | Royle | June 26, 1934 |